(12) United States Patent
Li et al.

(10) Patent No.: US 11,677,572 B2
(45) Date of Patent: Jun. 13, 2023

(54) PERMISSION-CONTROLLED SMART CONTRACT UPGRADE METHOD AND SYSTEM BASED ON SMART CONTRACT, BLOCKCHAIN NODE, AND STORAGE MEDIUM

(71) Applicant: HANGZHOU QULIAN TECHNOLOGY CO., LTD., Hangzhou (CN)

(72) Inventors: Wei Li, Hangzhou (CN); Weiwei Qiu, Hangzhou (CN); Keting Yin, Hangzhou (CN); Qilei Li, Hangzhou (CN); Jialei Rong, Hangzhou (CN); Zhiqiang Wu, Hangzhou (CN)

(73) Assignee: HANGZHOU QULIAN TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/685,507

(22) Filed: Mar. 3, 2022

(65) Prior Publication Data
US 2022/0278861 A1 Sep. 1, 2022

Related U.S. Application Data

(63) Continuation-in-part of application No. 16/762,154, filed as application No. PCT/CN2019/103502 on Aug. 30, 2019, now Pat. No. 11,301,233.

(30) Foreign Application Priority Data

Oct. 24, 2018 (CN) .......................... 201811242629.1

(51) Int. Cl.
*G06F 8/65* (2018.01)
*H04L 9/00* (2022.01)

(52) U.S. Cl.
CPC ..................................... *H04L 9/50* (2022.05)

(58) Field of Classification Search
CPC ....................................................... G06F 8/65
See application file for complete search history.

(56) References Cited

U.S. PATENT DOCUMENTS 10,871,948 B1 * 12/2020 Dowling ............... H04L 9/3239
2017/0279774 A1 * 9/2017 Booz ..................... G06Q 20/123
(Continued)

*Primary Examiner* — Jae U Jeon
(74) *Attorney, Agent, or Firm* — Brooks Kushman P. C.; John E. Nemazi

(57) ABSTRACT

The present disclosure provides a permission-controlled smart contract upgrade method. The method first deploys a contract upgrade smart contract, and then deploys a smart contract to be upgraded including information of a required minimum number of agreements on passing a proposal related to the contract. Then, any of the blockchain nodes receives a contract upgrade proposal submitted by one of the plurality of user clients. After the contract upgrade smart contract determines to pass the proposal, a proposing event is generated and then is forwarded to each user client participating in the contract. After the user client receives the proposing event, the user client receives user's vote and feeds it back to the contract upgrade smart contract. If the number of agreements exceeds the required minimum number of agreements, the proposal is passed and employed, and a binary replacement is performed to complete upgrade of the smart contract.

14 Claims, 5 Drawing Sheets

(56) References Cited

U.S. PATENT DOCUMENTS

2018/0020324 A1* 1/2018 Beauford .............. H04L 43/10
2018/0123779 A1* 5/2018 Zhang .................. H04L 9/0637
2019/0384748 A1* 12/2019 Roennow ............... G06F 21/64

* cited by examiner

PERMISSION-CONTROLLED SMART CONTRACT UPGRADE METHOD AND SYSTEM BASED ON SMART CONTRACT, BLOCKCHAIN NODE, AND STORAGE MEDIUM

CROSS REFERENCE TO RELATED APPLICATION

This application is a continuation-in-part of U.S. patent application Ser. No. 16/762,154, filed on May 7, 2020, which is the U.S. national phase of PCT Application No. PCT/CN2019/103502 filed on Aug. 30, 2019, which claims priority to Chinese patent application No. 201811242629.1 filed on Oct. 24, 2018 and entitled "permission-controlled smart contract upgrade method based on smart contract", the disclosures of which are incorporated herein by reference in their entirety.

FIELD

The present disclosure relates to the smart contract technologies, and particularly, to a permission-controlled smart contract upgrade method based on a smart contract.

BACKGROUND

Smart contract is a concept proposed by Nick Saab in the 1990s and is almost the same age as the Internet. Due to the lack of a trusted execution environment, the smart contract is not applied to the actual industry. Since the birth of Bitcoin, people have realized that Bitcoin's underlying technology, the blockchain, can inherently provide a trusted execution environment for the smart contract. The smart contract is an assembly language programmed on the blockchain. Generally, people do not write bytecode by themselves, but they compile it with a higher level language.

In the traditional blockchain smart contract upgrade, an update request is initiated by the deployer, and the contract can be directly upgraded. In the alliance chain system, such design has the following problems: a problem of a single point of failure, in which a contract can no longer be upgraded if the deployer loses his private key; and a problem of breach, under which a smart contract may involve multiple participants and the deployer can unilaterally upgrade the contract without the consent of the remaining participants.

SUMMARY

Aiming at the deficiency of the prior art, the present disclosure provides a permission-controlled smart contract upgrade method based on a smart contract, which provides a permission control for the smart contract upgrade and enhances the security. The specific technical solutions are as follows:

A permission-controlled smart contract upgrade method based on a smart contract is provided in one embodiment of the present disclosure, the method includes steps of:

receiving, by a blockchain node of a blockchain including a plurality of blockchain nodes and a plurality of clients, a request of deploying a contract upgrade smart contract, and deploying the contract upgrade smart contract into each of the plurality of blockchain nodes;

deploying a smart contract to be upgraded into the plurality of blockchain nodes, the smart contract to be upgraded including reservation information of contract participants and information of a required minimum number of agreements on passing a proposal related to the contract;

receiving, by one of the plurality of blockchain nodes, a contract upgrade proposal submitted by one of the plurality of user clients, the contract upgrade proposal carrying an address of the smart contract to be upgraded and binary information of a new contract; confirming, by the contract upgrade smart contract, whether the contract upgrade proposal meets a prerequisite; generating, by the contract upgrade smart contract, a contract upgrade proposal proposing event and forwarding the contract upgrade proposal proposing event to each of the plurality of user clients participating in the contract if the contract upgrade smart contract confirms that the contract upgrade proposal meets the prerequisite;

receiving, by each of the user clients, voting information of a corresponding user in response to the contract upgrade proposal proposing event based on corresponding information, and feeding back, by each of the plurality of user clients, the voting information to the contract upgrade smart contract; and collecting, by the contract upgrade smart contract, a number of agreements according to the voting information; and determining that the contract upgrade proposal is passed, generating a passing event and notifying all of the plurality of blockchain nodes of the passing event by the contract upgrade smart contract when the number of agreements collected in a predetermined time limit exceeds the required minimum number of agreements, and performing, by each of the plurality of blockchain nodes, a binary replacement to complete upgrade of the smart contract; or alternatively, determining, by the contract upgrade smart contract, that the contract upgrade proposal is abandoned with no upgrade when an insufficient number of agreements has been collected within the predetermined time limit.

Further, said confirming, by the contract upgrade smart contract, whether the contract upgrade proposal meets the prerequisite includes:

checking, by the contract upgrade smart contract, whether the address of the smart contract to be upgraded is legitimate;

checking, by the contract upgrade smart contract, whether a proposal initiator of the smart contract to be upgraded is one of the contract participants; and confirming, by the contract upgrade smart contract, that the contract upgrade proposal meets the prerequisite if the address of the smart contract to be upgraded is legitimate and the proposal initiator of the smart contract to be upgraded is one of the contract participants.

Further, said confirming, by the contract upgrade smart contract, whether the proposal initiator of the smart contract to be upgraded is one of the contract participants includes:

collecting, by the contract upgrade smart contract, information of the proposal initiator of the smart contract to be upgraded, and comparing, by the contract upgrade smart contract, the information of the proposal initiator of the smart contract to be upgraded with the reservation information of the contract participants one-by-one; and determining, by the contract upgrade smart contract, that the proposal initiator of the smart contract to be upgraded is one of the contract participants if the information of the proposal initiator of the smart contract to be upgraded is determined as being consistent with the reservation information of one of the contract participants; wherein the reservation information of the contract participants comprises IP addresses or identifications of the user clients participating in the contract.

Further, the method further includes:

generating and recording a contract upgrade failure event, and broadcasting the contract upgrade failure event to each of the user clients participating in the contract, if the contract upgrade smart contract confirms that the contract upgrade proposal does not meet the prerequisite.

Further, the method further includes:

updating the reservation information of the contract participants of the smart contract to be upgraded and the information of the required minimum number of agreements on passing the proposal related to the contract by voting on proposals to adapt to an increase or a decrease of contract users.

Further, said deploying the smart contract to be upgraded further includes:

redundantly backing up the information of contract participants of the smart contract to be upgraded and the information of the required minimum number of agreements on passing a proposal related to the contract in each of the plurality of blockchain nodes.

In the second aspect, a permission-controlled smart contract upgrade system based on a smart contract is provided in another embodiment of the present disclosure, the system includes a plurality of blockchain nodes and a plurality of user clients, where a contract upgrade smart contract is deployed into each of the plurality of blockchain nodes, and information of a smart contract to be upgraded, including reservation information of contract participants and information of a required minimum number of agreements on passing a proposal related to the contract, are recorded in each of the plurality of blockchain nodes;

where each of the plurality of blockchain nodes is configured to: receive a contract upgrade proposal submitted by one of the plurality of user clients, the contract upgrade proposal carrying an address of the smart contract to be upgraded and binary information of a new contract; confirm whether the contract upgrade proposal meets a prerequisite by the contract upgrade smart contract; generate a contract upgrade proposal proposing event and forward the contract upgrade proposal proposing event to each of the plurality of user clients participating in the contract by the contract upgrade smart contract if the contract upgrade smart contract confirms that the contract upgrade proposal meets the prerequisite;

each of the plurality of user clients is configured to receive voting information of a corresponding user in response to the contract upgrade proposal proposing event based on corresponding information, and feed back the voting information to the contract upgrade smart contract;

each of the plurality of blockchain nodes is further configured to: collect a number of agreements according to the voting information by the contract upgrade smart contract, determine that the contract upgrade proposal is passed, generate a passing event and notify all of the plurality of blockchain nodes of the passing event by the contract upgrade smart contract when the number of agreements collected by the contract upgrade smart contract in a predetermined time limit exceeds the required minimum number of agreements, and perform a binary replacement to complete upgrade of the smart contract; or alternatively determine that the contract upgrade proposal is abandoned with no upgrade when an insufficient number of agreements has been collected by the contract upgrade smart contract within the predetermined time limit.

Further, each of the plurality of blockchain nodes is further configured to confirm that the contract upgrade proposal meets the prerequisite if the blockchain node confirms that an address of the smart contract to be upgraded is legitimate and a proposal initiator of the smart contract to be upgraded is one of the contract participants.

Further, each of the plurality of blockchain nodes is further configured to collect information of the proposal initiator of the smart contract to be upgraded, and compare the information of the proposal initiator of the smart contract to be upgraded with the reservation information of the contract participants one-by-one, and determine that the proposal initiator of the smart contract to be upgraded is one of the contract participants if the information of the proposal initiator of the smart contract to be upgraded is determined as being consistent with the reservation information of one of the contract participants; wherein the reservation information of the contract participants comprises IP addresses or identifications of the user clients participating in the contract.

Further, each of the plurality of blockchain nodes is further configured to generate and record a contract upgrade failure event, and broadcast the contract upgrade failure event to each of the user clients participating in the contract, if it is confirmed that the contract upgrade proposal does not meet the prerequisite.

Further, each of the plurality of blockchain nodes is further configured to update the reservation information of the contract participants of the smart contract to be upgraded and the information of the required minimum number of agreements on passing the proposal related to the contract according to the voting information of the corresponding user in response to the contract upgrade proposal proposing event so as to adapt to an increase or a decrease of contract users.

Further, each of the plurality of blockchain nodes is further configured to redundantly back up the information of contract participants of the smart contract to be upgraded and the information of the required minimum number of agreements on passing a proposal related to the contract in each of the plurality of blockchain nodes.

In the third aspect, a blockchain node is provided in another embodiment of the present disclosure, where the blockchain node is included in a blockchain including a plurality of blockchain nodes and a plurality of user clients, the blockchain node includes a memory, a processor and a computer program stored in the memory and executable by the processor, where the processor is configured to, when executing the computer program, implement following method steps:

receiving a request of deploying a contract upgrade smart contract, and deploying the contract upgrade smart contract into each of the plurality of blockchain nodes;

deploying a smart contract to be upgraded into the plurality of blockchain nodes, the smart contract to be upgraded including reservation information of contract participants and information of a required minimum number of agreements on passing a proposal related to the contract;

receiving a contract upgrade proposal submitted by one of the plurality of user clients, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if it is confirmed that the contract upgrade proposal meets the prerequisite;

receiving voting information from one of the plurality of user clients in response to the contract upgrade proposal proposing event based on corresponding information; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; or determining that the contract upgrade proposal is abandoned with no upgrade when an insufficient number of agreements has been collected within the predetermined time limit.

In the fourth aspect, a non-transitory computer readable storage medium is provided in another embodiment of the present disclosure, where the computer readable storage medium stores a computer program, that, when executed by a processor of a blockchain node of a blockchain including a plurality of blockchain nodes and a plurality of user clients, causes the processor to implement following method steps, including:

receiving a request of deploying a contract upgrade smart contract, and deploying the contract upgrade smart contract into each of the plurality of blockchain nodes;

deploying a smart contract to be upgraded into the plurality of blockchain nodes, the smart contract to be upgraded comprising reservation information of contract participants and information of a required minimum number of agreements on passing a proposal related to the contract;

receiving a contract upgrade proposal submitted by one of the plurality of user clients, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if it is confirmed that the contract upgrade proposal meets the prerequisite;

receiving voting information from one of the plurality of user clients in response to the contract upgrade proposal proposing event based on corresponding information; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; or determining that the contract upgrade proposal is abandoned with no upgrade when an insufficient number of agreements has been collected within the predetermined time limit.

The beneficial effects of the present disclosure are as follows:

The permission-controlled smart contract upgrade method based on a smart contract according to the present disclosure performs a permission control to the contract upgrade, and the contract upgrade can be performed only when the consent of the predetermined number of contract participants is acquired, thereby avoiding a single point of failure and the possibility of breach and thus improving safety.

DESCRIPTION OF EMBODIMENTS

The present disclosure is described in detail below with reference to the accompanying drawings and preferred embodiments, so that the objects and effects of the present disclosure will become clearer. The present disclosure will be further described in detail with reference to the drawings and embodiments. It should be understood that the specific embodiments described herein are only used to explain the present disclosure and are not intended to limit the present disclosure.

Embodiment One

Figure 1:
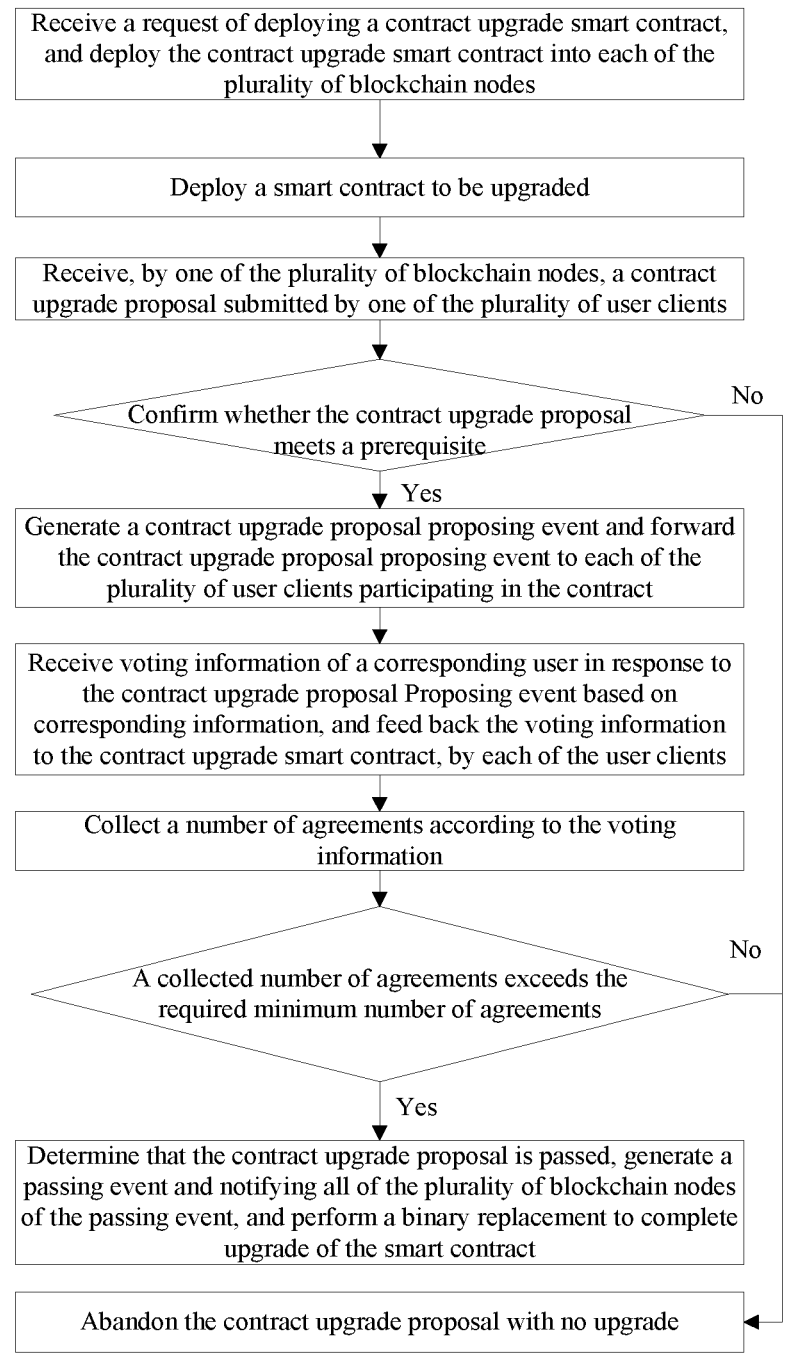
FIG. 1 is a detailed flowchart of a permission-controlled smart contract upgrade method based on a smart contract according to one embodiment of the present disclosure.

As shown in FIG. 1, a permission-controlled smart contract upgrade method based on a smart contract is illustrated in embodiment one of the present disclosure, the method includes steps of:

receiving, by a blockchain node 1 of a blockchain including a plurality of blockchain nodes 1 and a plurality of clients 2, a request of deploying a contract upgrade smart contract, and deploying, by the blockchain node 1, the contract upgrade smart contract into each of the plurality of blockchain nodes 1;

deploying a smart contract to be upgraded into the plurality of blockchain nodes, where the smart contract to be upgraded includes reservation information of contract participants and information of a required minimum number of agreements on passing a proposal related to the contract;

receiving, by one of the plurality of blockchain nodes 1, a contract upgrade proposal submitted by one of the plurality of user clients 2, the contract upgrade proposal carrying an address of the smart contract to be upgraded and binary information of a new contract; confirming, by the contract upgrade smart contract, whether the contract upgrade proposal meets a prerequisite; generating, by the contract upgrade smart contract, a contract upgrade proposal proposing event and forwarding the contract upgrade proposal proposing event to each of the plurality of user clients 2 participating in the contract if the contract upgrade smart contract confirms that the contract upgrade proposal meets the prerequisite;

receiving, by each of the user clients 2, voting information of a corresponding user in response to the contract upgrade proposal proposing event based on corresponding information, and feeding back, by each of the plurality of user clients 2, the voting information to the contract upgrade smart contract; and collecting, by the contract upgrade smart contract, a number of agreements according to the voting information; and determining that the contract upgrade proposal is passed, generating a passing event and notifying all of the plurality of blockchain nodes 1 of the passing event by the contract upgrade smart contract when the number of agreements collected in a predetermined time limit exceeds the required minimum number of agreements, and performing, by each of the plurality of blockchain nodes 1, a binary replacement to complete upgrade of the smart contract; or alternatively determining, by the contract upgrade smart contract, that the contract upgrade proposal is abandoned with no upgrade when an insufficient number of agreements has been collected within the predetermined time limit.

Figure 2:
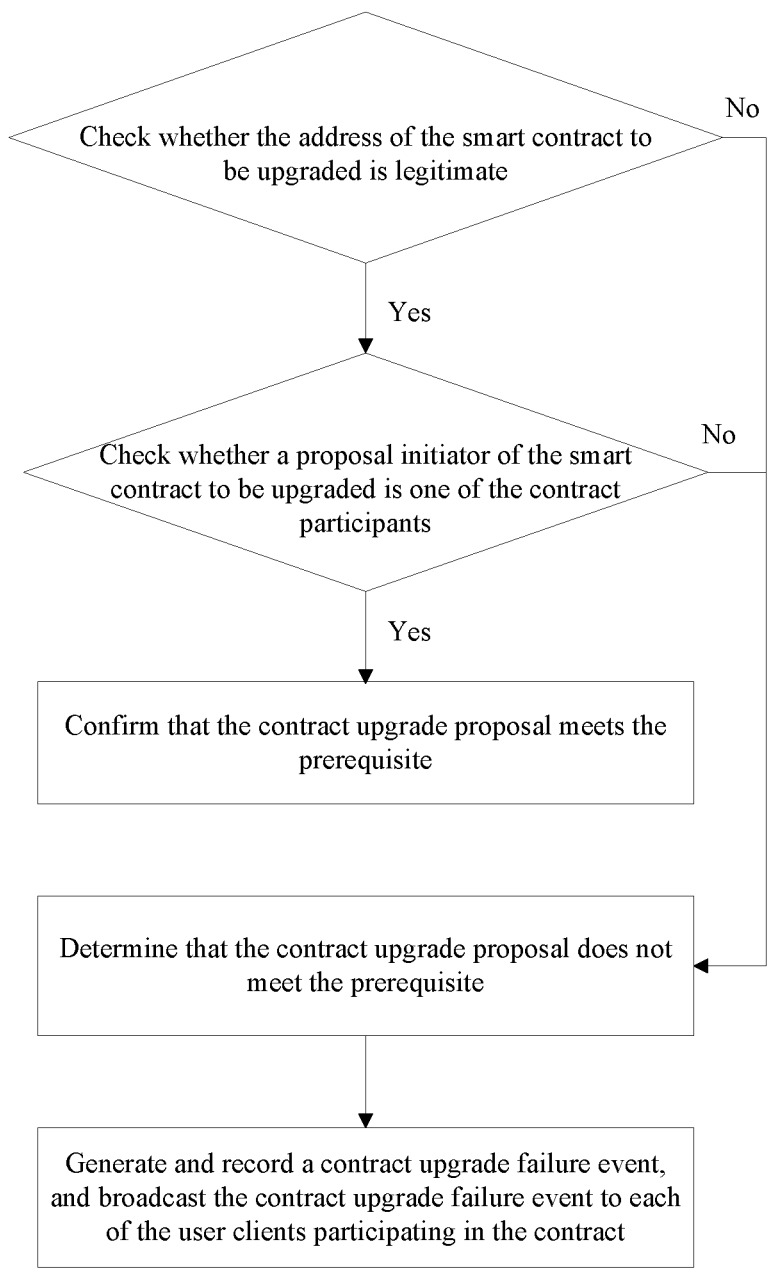
FIG. 2 is a flowchart of a method of confirming whether the contract upgrade proposal meets the prerequisite in the permission-controlled smart contract upgrade method according to the present disclosure.

Preferably, FIG. 2 illustrates a flowchart of a method of confirming whether the contract upgrade proposal meets the prerequisite in the permission-controlled smart contract upgrade method according to the present disclosure, as shown in FIG. 2, the step of confirming, by the contract upgrade smart contract, whether the contract upgrade proposal meets the prerequisite includes:

checking, by the contract upgrade smart contract, whether the address of the smart contract to be upgraded is legitimate;

checking, by the contract upgrade smart contract, whether a proposal initiator of the smart contract to be upgraded is one of the contract participants; and confirming, by the contract upgrade smart contract, that the contract upgrade proposal meets the prerequisite if the address of the smart contract to be upgraded is legitimate and the proposal initiator of the smart contract to be upgraded is one of the contract participants.

Figure 3:
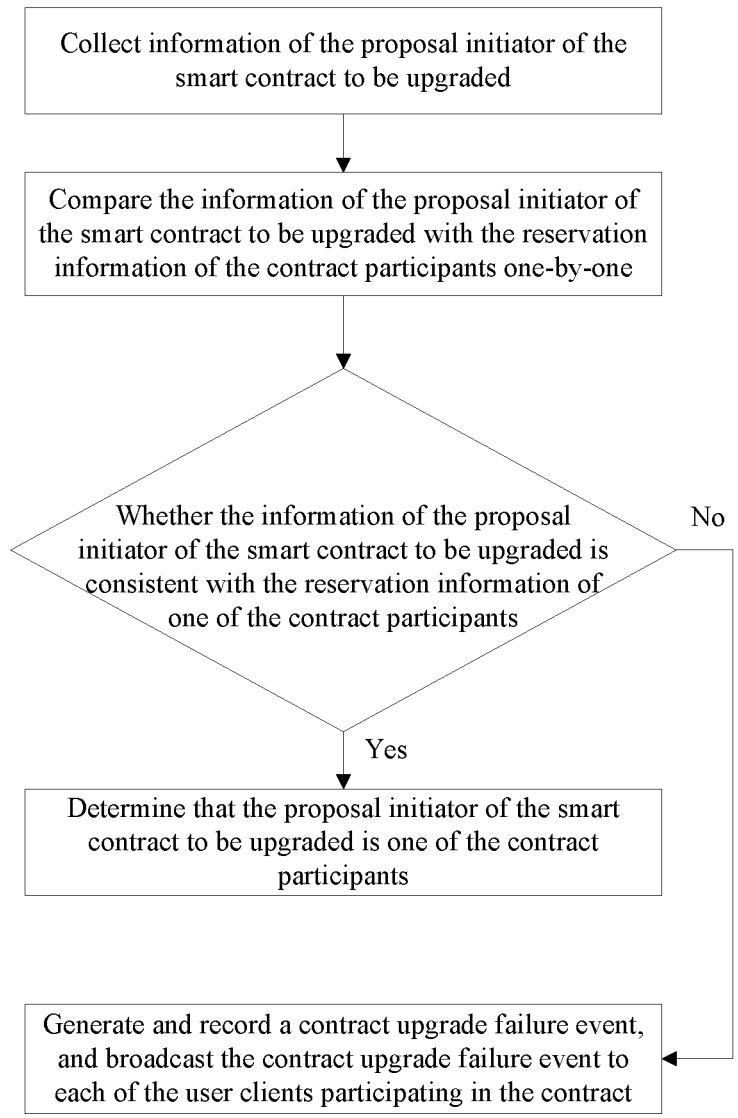
FIG. 3 is a flowchart of a method of confirming whether the proposal initiator of the smart contract to be upgraded is one of the contract participants in the permission-controlled smart contract upgrade method according to the present disclosure.

Preferably, FIG. 3 illustrates a flowchart of a method of confirming whether the proposal initiator of the smart contract to be upgraded is one of the contract participants in the permission-controlled smart contract upgrade method according to the present disclosure; as shown in FIG. 3, the step of confirming, by the contract upgrade smart contract, whether the proposal initiator of the smart contract to be upgraded is one of the contract participants includes:

collecting, by the contract upgrade smart contract, information of the proposal initiator of the smart contract to be upgraded, and comparing, by the contract upgrade smart contract, the information of the proposal initiator of the smart contract to be upgraded with the reservation information of the contract participants one-by-one; and determining, by the contract upgrade smart contract, that the proposal initiator of the smart contract to be upgraded is one of the contract participants if the information of the proposal initiator of the smart contract to be upgraded is determined as being consistent with the reservation information of one of the contract participants; where the reservation information of the contract participants includes IP addresses or identifications of the user clients participating in the contract.

Preferably, referring to in FIG. 2, the method further includes a step of:

generating and recording a contract upgrade failure event, and broadcasting the contract upgrade failure event to each of the user clients 2 participating in the contract, if the contract upgrade smart contract confirms that the contract upgrade proposal does not meet the prerequisite.

Preferably, the method further includes a step of:

updating the reservation information of the contract participants of the smart contract to be upgraded and the information of the required minimum number of agreements on passing the proposal related to the contract by voting on proposals to adapt to an increase or a decrease of contract users.

Preferably, the step of deploying the smart contract to be upgraded into the plurality of blockchain nodes 1 further includes a step of:

redundantly backing up the information of contract participants of the smart contract to be upgraded and the information of the required minimum number of agreements on passing a proposal related to the contract in each of the plurality of blockchain nodes.

Embodiment Two

Figure 4:
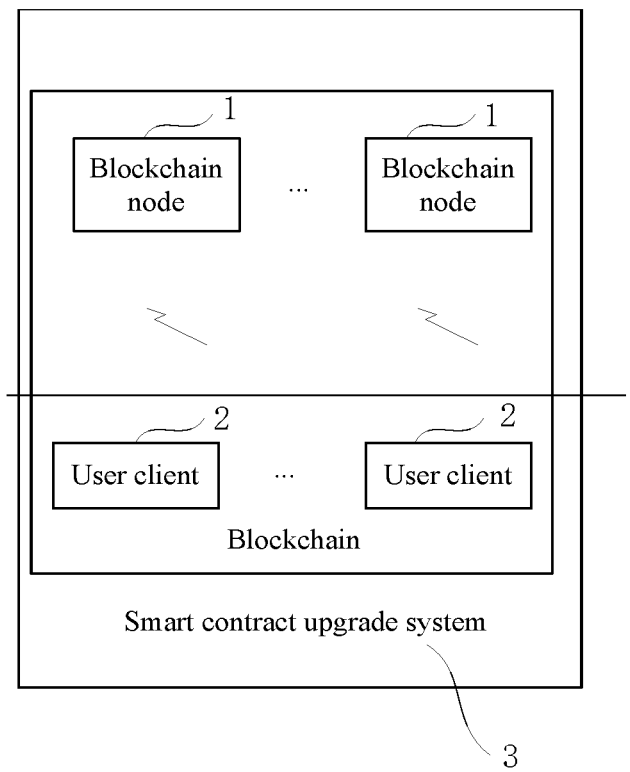
FIG. 4 is a schematic block diagram of a permission-controlled smart contract upgrade system based on a smart contract according to another embodiment of the present disclosure.

In accordance with the permission-controlled smart contract upgrade method based on a smart contract shown in FIG. 1, FIG. 4 illustrates a schematic block diagram of a permission-controlled smart contract upgrade system 3 based on a smart contract according to embodiment two of the present disclosure; as shown in FIG. 3, this system 3 includes a plurality of blockchain nodes 1 and a plurality of user clients 2, where a contract upgrade smart contract is deployed into each of the plurality of blockchain nodes 1, and information of a smart contract to be upgraded, including reservation information of contract participants and information of a required minimum number of agreements on passing a proposal related to the contract, are recorded in each of the plurality of blockchain nodes 1;

where each of the plurality of blockchain nodes 1 is configured to: receive a contract upgrade proposal submitted by one of the plurality of user clients 2, the contract upgrade proposal carrying an address of the smart contract to be upgraded and binary information of a new contract; confirm whether the contract upgrade proposal meets a prerequisite by the contract upgrade smart contract; generate a contract upgrade proposal proposing event and forward the contract upgrade proposal proposing event to each of the plurality of user clients participating in the contract by the contract upgrade smart contract if the contract upgrade smart contract confirms that the contract upgrade proposal meets the prerequisite;

each of the plurality of user clients 2 is configured to receive voting information of a corresponding user in response to the contract upgrade proposal proposing event based on corresponding information, and feed back the voting information to the contract upgrade smart contract;

each of the plurality of blockchain nodes 1 is further configured to: collect a number of agreements according to the voting information by the contract upgrade smart contract, determine that the contract upgrade proposal is passed, generate a passing event and notify all of the plurality of blockchain nodes of the passing event by the contract upgrade smart contract when the number of agreements collected by the contract upgrade smart contract in a predetermined time limit exceeds the required minimum number of agreements, and perform a binary replacement to complete upgrade of the smart contract; or determine that the contract upgrade proposal is abandoned with no upgrade when an insufficient number of agreements has been collected by the contract upgrade smart contract within the predetermined time limit.

Preferably, each of the plurality of blockchain nodes 1 is further configured to confirm that the contract upgrade proposal meets the prerequisite, if the blockchain node 1 confirms that an address of the smart contract to be upgraded is legitimate and a proposal initiator of the smart contract to be upgraded is one of the contract participants.

Preferably, each of the plurality of blockchain nodes 1 is further configured to collect information of the proposal initiator of the smart contract to be upgraded, and compare the information of the proposal initiator of the smart contract to be upgraded with the reservation information of the contract participants one-by-one, and determine that the proposal initiator of the smart contract to be upgraded is one of the contract participants if the information of the proposal initiator of the smart contract to be upgraded is determined as being consistent with the reservation information of one of the contract participants; where the reservation information of the contract participants comprises IP addresses or identifications of the user clients participating in the contract.

Preferably, each of the plurality of blockchain nodes 1 is further configured to generate and record a contract upgrade failure event, and broadcast the contract upgrade failure event to each of the user clients 2 participating in the contract, if it is confirmed that the contract upgrade proposal does not meet the prerequisite.

Preferably, each of the plurality of blockchain nodes 1 is further configured to update the reservation information of the contract participants of the smart contract to be upgraded and the information of the required minimum number of agreements on passing the proposal related to the contract according to the voting information of the corresponding user in response to the contract upgrade proposal proposing event so as to adapt to an increase or a decrease of contract users.

Preferably, each of the plurality of blockchain nodes 1 is further configured to redundantly back up the information of contract participants of the smart contract to be upgraded and the information of the required minimum number of agreements on passing a proposal related to the contract in each of the plurality of blockchain nodes 1.

Embodiment Three

Figure 5:
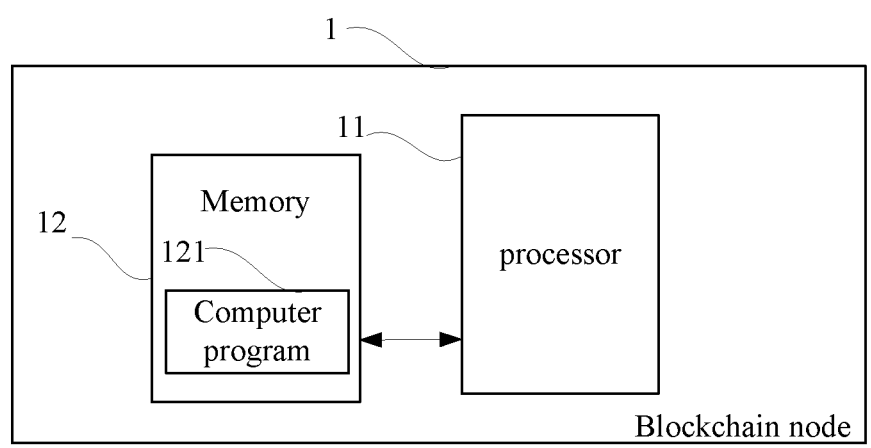
FIG. 5 is a schematic block diagram of one of the plurality of blockchain nodes in the permission-controlled smart contract upgrade system according to another embodiment of the present disclosure.

FIG. 5 illustrates a schematic block diagram of a blockchain node 1 according to embodiment three of the present disclosure; where the blockchain node 1 is included in a blockchain including a plurality of blockchain nodes 1 and a plurality of user clients 2; as shown in FIG. 4, the blockchain node 1 includes a processor 11, a memory 12, and a computer program 121 stored in the memory 12 and executable by the processor 11, the processor 11 is configured to, when executing the computer program 121, implement following method steps:

receiving a request of deploying a contract upgrade smart contract, and deploying the contract upgrade smart contract into each of the plurality of blockchain nodes 1;

deploying a smart contract to be upgraded into the plurality of blockchain nodes, the smart contract to be upgraded comprising reservation information of contract participants and information of a required minimum number of agreements on passing a proposal related to the contract;

receiving a contract upgrade proposal submitted by one of the plurality of user clients, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if the contract upgrade smart contract confirms that the contract upgrade proposal meets the prerequisite;

receiving voting information from one of the plurality of user clients in response to the contract upgrade proposal proposing event based on corresponding information; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; or alternatively determining that the contract upgrade proposal is abandoned with no upgrade when an insufficient number of agreements has been collected within the predetermined time limit.

Embodiment Four

Figure 6:
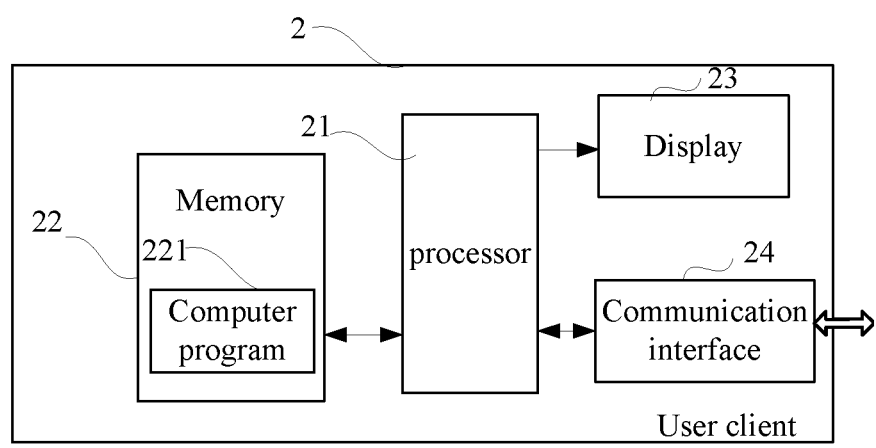
FIG. 6 is a schematic block diagram of one of the plurality of user clients in the permission-controlled smart contract upgrade system according to another embodiment of the present disclosure.

A user client 2 is further disclosed in embodiment five of the present disclosure, FIG. 6 illustrates a schematic block diagram of the user client 2. As shown in FIG. 6, the user client 2 at least includes a processor 21, a memory 22 which stores a computer program 221, a display 23 and a communication interface 24.

Embodiment Five

A non-transitory computer readable storage medium is further disclosed in embodiment four of the present disclosure, the computer readable storage medium stores a computer program, that, when executed by a processor 11 of a blockchain node 1 of a blockchain which includes a plurality of blockchain nodes 1 and a plurality of user clients 2, causes the processor to implement method steps, including:

receiving a request of deploying a contract upgrade smart contract, and deploying the contract upgrade smart contract into each of the plurality of blockchain nodes 1;

deploying a smart contract to be upgraded into the plurality of blockchain nodes, the smart contract to be upgraded including reservation information of contract participants and information of a required minimum number of agreements on passing a proposal related to the contract;

receiving a contract upgrade proposal submitted by one of the plurality of user clients 2, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if the contract upgrade smart contract confirms that the contract upgrade proposal meets the prerequisite;

receiving voting information from one of the plurality of user clients in response to the contract upgrade proposal proposing event based on corresponding information; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; or alternatively, determining that the contract upgrade proposal is abandoned with no upgrade when an insufficient number of agreements has been collected within the predetermined time limit.

In the embodiments of the present disclosure, the processor may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor and the like.

It is obvious to a person of ordinary skilled in the art that, the computer program may be stored in a non-volatile computer readable storage medium, when the computer program is executed, the steps in the various method embodiments described above may be included. The non-volatile computer readable storage medium may include ROM (Read Only Memory), programmable ROM, EPROM (Electrically Programmable Read Only Memory), EEPROM (Electrically Erasable Programmable Read Only Memory), or flash memory. The volatile memory may include RAM (Random Access Memory) or external cache memory. By way of illustration instead of limitation, RAM is available in a variety of forms such as SRAM (Static RAM), DRAM (Dynamic RAM), SDRAM (Synchronous DRAM), DDR (Double Data Rate) SDRAM, ESDRAM (Enhanced SDRAM), Synchlink DRAM, RDRAM (Rambus Direct RAM), DRDRAM (Direct RamBus Dynamic RAM), and RDRAM (Rambus Dynamic RAM), etc.

Those of ordinary skill in the art can understand that the above description only illustrates preferred examples of the present disclosure and is not intended to limit the present disclosure. Although the disclosure has been described in detail with reference to the foregoing examples, it can be understood by those skilled in the art that the technical solutions described in the foregoing examples can still be modified, or some technical features in the foregoing examples can be replaced by other equivalent technical features. Any modification, equivalent replacement, and the like, within the spirit and principle of the disclosure shall fall into the protection scope of the disclosure.

What is claimed is:

1. A permission-controlled smart contract upgrade method based on a smart contract, comprising:
    receiving, by a blockchain node of a blockchain comprising a plurality of blockchain nodes and a plurality of user clients, a request of deploying a contract upgrade smart contract, and deploying the contract upgrade smart contract into each of the plurality of blockchain nodes;
    deploying a smart contract to be upgraded into the plurality of blockchain nodes, the smart contract to be upgraded comprising reservation information of contract participants and information of a required minimum number of agreements on passing a proposal related to the contract;
    receiving, by one of the plurality of blockchain nodes, a contract upgrade proposal submitted by one of the plurality of user clients, the contract upgrade proposal carrying an address of the smart contract to be upgraded and binary information of a new contract;
    confirming, by the contract upgrade smart contract, whether the contract upgrade proposal meets a prerequisite; generating, by the contract upgrade smart contract, a contract upgrade proposal proposing event and forwarding the contract upgrade proposal proposing event to each of the plurality of user clients participating in the contract if the contract upgrade smart contract confirms that the contract upgrade proposal meets the prerequisite;
    receiving, by each of the user clients, voting information of a corresponding user in response to the contract upgrade proposal proposing event based on corresponding information, and feeding back, by each of the plurality of user clients, the voting information to the contract upgrade smart contract; and
    collecting, by the contract upgrade smart contract, a number of agreements according to the voting information; and determining that the contract upgrade proposal is passed, generating a passing event and notifying all of the plurality of blockchain nodes of the passing event by the contract upgrade smart contract when the number of agreements collected in a predetermined time limit exceeds the required minimum number of agreements, and performing, by each of the plurality of blockchain nodes, a binary replacement to complete upgrade of the smart contract; or alternatively, determining, by the contract upgrade smart contract, that the contract upgrade proposal is abandoned with no upgrade when an insufficient number of agreements has been collected within the predetermined time limit.

2. The method according to claim 1, wherein said confirming, by the contract upgrade smart contract, whether the contract upgrade proposal meets the prerequisite comprises:
    checking, by the contract upgrade smart contract, whether the address of the smart contract to be upgraded is legitimate;
    checking, by the contract upgrade smart contract, whether a proposal initiator of the smart contract to be upgraded is one of the contract participants; and
    confirming, by the contract upgrade smart contract, that the contract upgrade proposal meets the prerequisite if the address of the smart contract to be upgraded is legitimate and the proposal initiator of the smart contract to be upgraded is one of the contract participants.

3. The method according to claim 2, wherein said confirming, by the contract upgrade smart contract, whether the proposal initiator of the smart contract to be upgraded is one of the contract participants comprises:
    collecting, by the contract upgrade smart contract, information of the proposal initiator of the smart contract to be upgraded, and comparing, by the contract upgrade smart contract, the information of the proposal initiator of the smart contract to be upgraded with the reservation information of the contract participants one-by-one; and determining, by the contract upgrade smart contract, that the proposal initiator of the smart contract to be upgraded is one of the contract participants if the information of the proposal initiator of the smart contract to be upgraded is determined as being consistent with the reservation information of one of the contract participants; wherein the reservation information of the contract participants comprises IP addresses or identifications of the user clients participating in the contract.

4. The method according to claim 1, further comprising:
    generating and recording a contract upgrade failure event, and broadcasting the contract upgrade failure event to each of the user clients participating in the contract, if the contract upgrade smart contract confirms that the contract upgrade proposal does not meet the prerequisite.

5. The method according to claim 1, further comprising:
updating the reservation information of the contract participants of the smart contract to be upgraded and the information of the required minimum number of agreements on passing the proposal related to the contract by voting on proposals to adapt to an increase or a decrease of contract users.

6. The method according to claim 1, wherein said deploying the smart contract to be upgraded further comprises:
redundantly backing up the information of contract participants of the smart contract to be upgraded and the information of the required minimum number of agreements on passing a proposal related to the contract in each of the plurality of blockchain nodes.

7. A permission-controlled smart contract upgrade system based on a smart contract, comprising a plurality of blockchain nodes and a plurality of user clients, wherein a contract upgrade smart contract is deployed into each of the plurality of blockchain nodes, and information of a smart contract to be upgraded, including reservation information of contract participants and information of a required minimum number of agreements on passing a proposal related to the contract, are recorded in each of the plurality of blockchain nodes;
wherein each of the plurality of blockchain nodes is configured to: receive a contract upgrade proposal submitted by one of the plurality of user clients, the contract upgrade proposal carrying an address of the smart contract to be upgraded and binary information of a new contract; confirm whether the contract upgrade proposal meets a prerequisite by the contract upgrade smart contract; generate a contract upgrade proposal proposing event and forward the contract upgrade proposal proposing event to each of the plurality of user clients participating in the contract by the contract upgrade smart contract if the contract upgrade smart contract confirms that the contract upgrade proposal meets the prerequisite;
each of the plurality of user clients is configured to receive voting information of a corresponding user in response to the contract upgrade proposal proposing event based on corresponding information, and feed back the voting information to the contract upgrade smart contract;
each of the plurality of blockchain nodes is further configured to: collect a number of agreements according to the voting information by the contract upgrade smart contract, determine that the contract upgrade proposal is passed, generate a passing event and notify all of the plurality of blockchain nodes of the passing event by the contract upgrade smart contract when the number of agreements collected by the contract upgrade smart contract in a predetermined time limit exceeds the required minimum number of agreements, and perform a binary replacement to complete upgrade of the smart contract; or alternatively determine that the contract upgrade proposal is abandoned with no upgrade when an insufficient number of agreements has been collected by the contract upgrade smart contract within the predetermined time limit.

8. The system according to claim 7, wherein each of the plurality of blockchain nodes is further configured to confirm that the contract upgrade proposal meets the prerequisite if the blockchain node confirms that an address of the smart contract to be upgraded is legitimate and a proposal initiator of the smart contract to be upgraded is one of the contract participants.

9. The system according to claim 7, wherein each of the plurality of blockchain nodes is further configured to collect information of the proposal initiator of the smart contract to be upgraded, and compare the information of the proposal initiator of the smart contract to be upgraded with the reservation information of the contract participants one-by-one, and determine that the proposal initiator of the smart contract to be upgraded is one of the contract participants if the information of the proposal initiator of the smart contract to be upgraded is determined as being consistent with the reservation information of one of the contract participants; wherein the reservation information of the contract participants comprises IP addresses or identifications of the user clients participating in the contract.

10. The system according to claim 7, wherein each of the plurality of blockchain nodes is further configured to generate and record a contract upgrade failure event, and broadcast the contract upgrade failure event to each of the user clients participating in the contract, if it is confirmed that the contract upgrade proposal does not meet the prerequisite.

11. The system according to claim 7, wherein each of the plurality of blockchain nodes is further configured to update the reservation information of the contract participants of the smart contract to be upgraded and the information of the required minimum number of agreements on passing the proposal related to the contract according to the voting information of the corresponding user in response to the contract upgrade proposal proposing event so as to adapt to an increase or a decrease of contract users.

12. The system according to claim 7, wherein each of the plurality of blockchain nodes is further configured to redundantly back up the information of contract participants of the smart contract to be upgraded and the information of the required minimum number of agreements on passing a proposal related to the contract in each of the plurality of blockchain nodes.

13. A blockchain node within a blockchain comprising a plurality of blockchain nodes and a plurality of user clients; wherein the blockchain node comprises a memory, a processor and a computer program stored in the memory and executable by the processor, the processor is configured to, when executing the computer program, implement following method steps:
receiving a request of deploying a contract upgrade smart contract, and deploying the contract upgrade smart contract into a blockchain comprising a plurality of blockchain nodes and a plurality of user clients;
deploying a smart contract to be upgraded into the plurality of blockchain nodes, the smart contract to be upgraded comprising reservation information of contract participants and information of a required minimum number of agreements on passing a proposal related to the contract;
receiving a contract upgrade proposal submitted by one of the plurality of user clients, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if it is confirmed that the contract upgrade proposal meets the prerequisite;

receiving voting information from one of the plurality of user clients in response to the contract upgrade proposal proposing event based on corresponding information; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; or determining that the contract upgrade proposal is abandoned with no upgrade when an insufficient number of agreements has been collected within the predetermined time limit.

14. A non-transitory computer readable storage medium which stores a computer program, that, when executed by a processor of a blockchain node of a blockchain including a plurality of blockchain nodes and a plurality of user clients, causes the processor to implement method steps, comprising:

receiving a request of deploying a contract upgrade smart contract, and deploying the contract upgrade smart contract into each of the plurality of blockchain nodes;

deploying a smart contract to be upgraded into the plurality of blockchain nodes, the smart contract to be upgraded comprising reservation information of contract participants and information of a required minimum number of agreements on passing a proposal related to the contract;

receiving a contract upgrade proposal submitted by one of the plurality of user clients, the contract upgrade proposal carrying an address of the smart contract to be upgraded and binary information of a new contract; confirming whether the contract upgrade proposal meets a prerequisite; generating a contract upgrade proposal proposing event and forwarding the contract upgrade proposal proposing event to each of the plurality of user clients participating in the contract if the contract upgrade smart contract confirms that the contract upgrade proposal meets the prerequisite;

receiving voting information from one of the plurality of user clients in response to the contract upgrade proposal proposing event based on corresponding information, and feeding back the voting information to the contract upgrade smart contract; and determining that the contract upgrade proposal is passed, generating a passing event and notifying all of the plurality of blockchain nodes of the passing event when a number of agreements collected according to the voting information in a predetermined time limit exceeds the required minimum number of agreements, and performing a binary replacement to complete upgrade of the smart contract; alternatively, determining that the contract upgrade proposal is abandoned with no upgrade when an insufficient number of agreements has been collected within the predetermined time limit.

* * * * *